United States Patent [19]
Millington

[11] Patent Number: 6,037,942
[45] Date of Patent: Mar. 14, 2000

[54] NAVIGATION SYSTEM CHARACTER INPUT DEVICE

[75] Inventor: Jeffrey Alan Millington, Rochester Hills, Mich.

[73] Assignee: Magellan DIS, Inc., Rochester Hills, Mich.

[21] Appl. No.: 09/037,772

[22] Filed: Mar. 10, 1998

[51] Int. Cl.[7] .................................................. G06F 3/00
[52] U.S. Cl. ...................... 345/353; 345/352; 345/326; 345/156; 701/202
[58] Field of Search .................................. 345/349, 326, 345/339, 334, 352, 353, 156

[56] References Cited

U.S. PATENT DOCUMENTS

| | | | |
|---|---|---|---|
| 5,661,476 | 8/1997 | Wang et al. | 341/22 |
| 5,689,667 | 11/1997 | Kurtenbach | 345/352 |
| 5,706,448 | 1/1998 | Blades | 345/326 |
| 5,805,167 | 9/1998 | Van Cruyningen | 345/353 |

FOREIGN PATENT DOCUMENTS

| | | |
|---|---|---|
| 0660083 | 6/1995 | European Pat. Off. . |
| 4343871 | 6/1995 | Germany . |
| 4428928 | 2/1996 | Germany . |

*Primary Examiner*—Raymond J. Bayerl
*Assistant Examiner*—David E. Brown
*Attorney, Agent, or Firm*—Howard & Howard

[57] ABSTRACT

The invention relates to a method and a device for a graphical user interface for a navigation system. The graphical user interface includes a display having several groups of symbols with each group arranged in a unique predetermined direction relative to a start position. A user manipulatable directional input device permits a user to select any one of the groups with a single keystroke. Once a group has been selected, the directional input device permits a user to activate any one of the symbols within a group with a single keystroke. An activated symbol can be selected with one keystroke by the user. Selection of a symbol then re-activates the start position.

24 Claims, 3 Drawing Sheets

NAVIGATION SYSTEM CHARACTER INPUT DEVICE

BACKGROUND OF THE INVENTION

This invention generally relates to navigation or route guidance systems and, more particularly, to a graphical user interface for a route guidance system.

Navigation systems generally provide a recommended route from a starting point to a desired destination. Generally, the starting point and desired destination are selected from a large database of roads stored in a mass media storage, such as a CD ROM, which includes the roads in the area to be travelled by the user. The navigation system can be located in a personal computer or it can be installed in a vehicle. If the navigation system is installed in a vehicle, the starting point is typically the current position of the vehicle, which can be input to the navigation system by an associated position determining system that usually includes a GPS (Global Positioning System) receiver.

The navigation system determines a route from the starting point to the destination utilizing an algorithm well-known to those in the art and currently in use in many navigation systems. Usually there are many potential routes between the selected starting point and the desired destination. Typical navigation systems select a recommended route based upon certain "cost" values associated with each segment of road in the road database. These cost values include the length of the road segment and the estimated time of travel through the road segment. The navigation system selects the potential route with the lowest total cost to be the recommended route. Depending upon the predetermined algorithm of the navigation system, the navigation system will recommend the route with the shortest total length, the lowest total time, or some weighted average of length and time.

The recommended route is then displayed to the user as a map showing the starting point and desired destination and highlighting the recommended route. Preferably, if the navigation system is installed in a vehicle, the navigation system displays the current position of the vehicle and provides turn-by-turn instructions to the driver, guiding the driver to the selected destination.

Navigation systems typically include a graphical user interface that allows a user to input the desired destination. For example, the user must input a city name for the desired destination. Since a full keyboard is impractical in a vehicle, the typical graphical user interface includes a directional input device such as a four-way button. The user is presented with the letters of the alphabet arranged in a single large rectangular array. The typical system requires the user to scroll through the alphabet one letter at a time using the directional input device, selecting a desired letter when it becomes highlighted. These systems have the disadvantage of requiring a large number of key strokes to input a given letter and the city name. Such systems can also be very time consuming and frustrating for a user.

Thus, it is desirable to provide a graphical user interface and a method that permits a user to rapidly select one character from a large array of characters using a simple input device. It is furthermore desirable to provide a graphical user interface and a method that allows a user to select one character from a large array of characters with a minimal number of keystrokes.

SUMMARY OF THE INVENTION

In general terms, this invention provides a unique arrangement of characters in combination with a directional input device which allows a user to select one character from a large array of characters using no more than three key strokes.

The graphical user interface generally includes a display device and a directional input device that is manipulatable by a user. The display device displays a plurality of groups arranged around a start position. Each group is located in a unique predetermined direction relative to the start position. Each group further includes a plurality of symbols that are arranged around a central position in the group. The directional input device is connected to the display device and is capable of transmitting a selection signal and a plurality of output signals, each of which is associated with one of the unique predetermined directions. Each of the groups is activated in response to one of the output signals. In addition, each symbol within an activated group is also activated in response to one of the output signals. An activated symbol can be selected by the user in response to the selection signal. Preferably, the symbols include the characters of the alphabet.

The method of the invention comprises the steps of displaying a plurality of groups including a first group, on a display device. Each group includes a plurality of symbols, including a first symbol, and each group is arranged in a unique predetermined direction relative to a start position. A first directional signal associated with one of the unique predetermined directions is transmitted from a user manipulatable directional input device to the display device. The first group is activated in response to the first directional signal. A second directional signal is then transmitted from the directional input device to the display device and the first symbol of the first group is activated in response to the second directional signal. A selection signal is then transmitted from the directional input device to the display device and the activated first symbol is selected. After a symbol has been selected, the start position is highlighted and a second symbol can be selected through the above steps.

This invention allows a user to rapidly select a desired symbol from a large array of symbols with a minimal number of keystrokes. The invention eliminates the need to scroll through each symbol individually until the desired symbol is activated.

These and other features and advantages of this invention will become more apparent to those skilled in the art from the following detailed description of the presently preferred embodiment. The drawings that accompany the detailed description can be described as follows.

DETAILED DESCRIPTION OF THE PREFERRED EMBODIMENT

Figure 1:
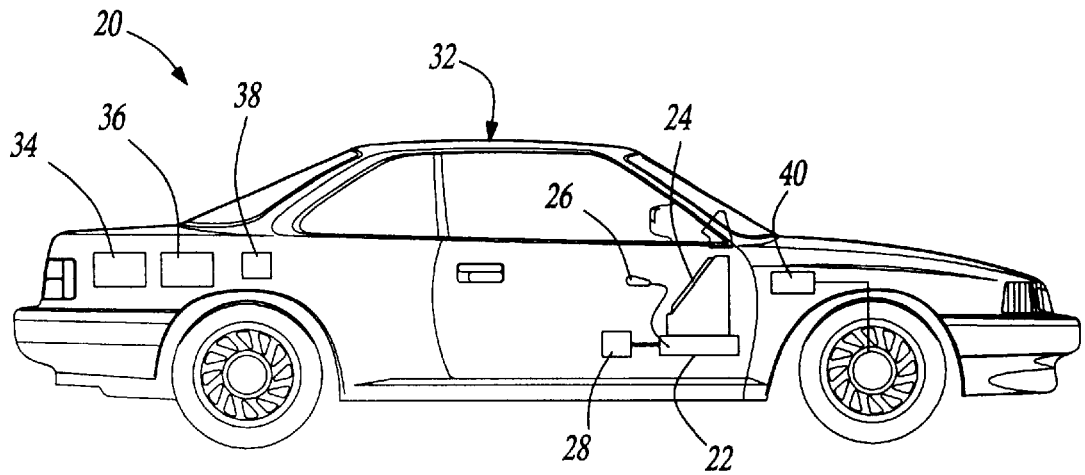
FIG. 1 is a schematic of a navigation system with the graphical user interface of the present invention installed in a vehicle.

The navigation system 20 of the present invention is shown schematically in FIG. 1. The navigation system 20 includes a CPU 22 (Central Processing Unit) connected to a display device 24, such as a high resolution LCD or flat panel display. The CPU 22 is also connected to a directional input device 26. The navigation system 20 further includes a database 28 connected to the CPU 22. The database 28 is a mass media storage device, such as a CD ROM or hard drive, which includes a map of all the roads in the area to be travelled by the user. Each road in the database is divided into road segments, each having an associated set of cost values, which indicate the "cost" of traveling that road segment. For example, the cost values may include the length of the road segment, the estimated time to travel the road segment, and the type of road (i.e., highway, secondary road, toll road, one way, etc.).

The navigation system 20 can, but need not, be installed in a vehicle 32. The navigation system can be used in conjunction with position determining devices, such as a GPS receiver 34, a gyroscope 36, a compass 38, and a wheel speed sensor 40, all connected to the CPU 22 (connections not shown for simplicity). Such position determining devices are well-known and are commercially available. Preferably, a combination of these position determining devices is utilized.

Figure 2:
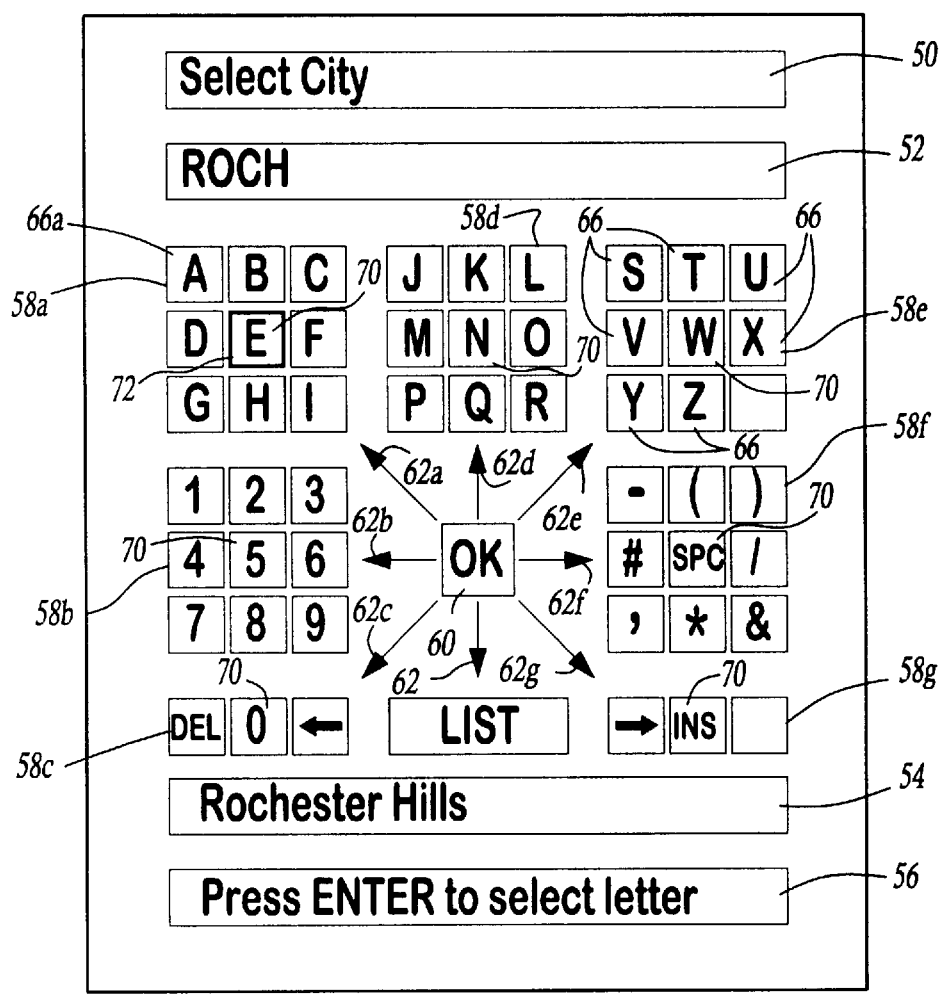
FIG. 2 is a screen display of an embodiment of the graphical user interface of the present invention illustrating the category of select a destination city.

FIG. 2 is a screen display of an embodiment of the graphical user interface of the present invention illustrating the category of "select a destination city". The display device 24 includes a category field 50 that displays a user selected category of information. In FIG. 2, the category of information selected is the destination city. The display device 24 further includes a type field 52, a lookahead field 54, and an instructional field 56. A plurality of groups 58a through 58g are arranged around a start position 60. Each group 58 is located in a unique, pre-determined direction 62a through 62g relative to the start position 60. A first group 58a is located in an upper left direction relative to the start position 60. Each group 58 includes a plurality of symbols 66. The symbols 66 in each group 58 are arranged around a central position 70, which also comprises a symbol 66, in the group 58. The first group 58a includes a first symbol 66a. In FIG. 2, the symbol E is shown as an activated symbol 72. An "activated" symbol 66 or the start position 60 may be indicated by a change in color, a brightening, an outline, flashing, or other known destructive markings.

Figure 3:
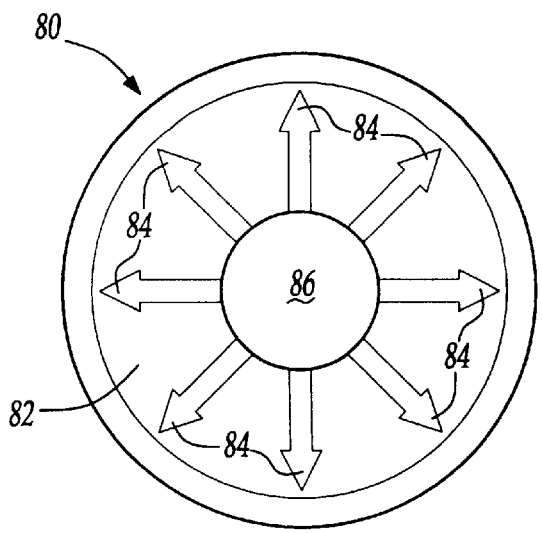
FIG. 3 is a plan view of an eight way button which could be used as the directional input device in FIG. 1.

FIG. 3 is a plan view of an eight way button shown generally at 80 which could be used as the directional input device 26 of FIG. 1. The eight way button 80 includes an internal disk 82 having a plurality of directional arrows 84. Each of the directional arrows 84 corresponds to one of the pre-determined directions 62 shown on the display device 24. The internal disk 82 is pivotally mounted in the eight way button 80 and is capable of moving in the direction of any one of the directional arrows 84. Movement of the internal disk 82 in the direction of one of the directional arrows 84 transmits a directional signal that is associated with one of the pre-determined directions 62. The eight way button 80 further includes a central point 86, wherein pressure on the central point 86 transmits a selection signal.

Figure 4:
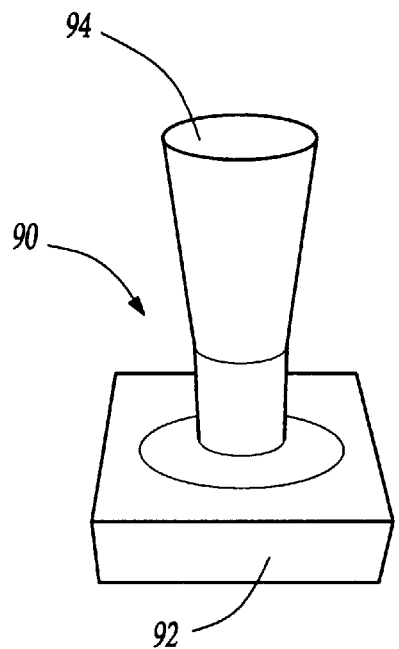
FIG. 4 is a perspective view of a joy stick which could be used as the directional input device in FIG. 1.

FIG. 4 is a perspective view of a joy stick show n generally at 90, which could alternatively be used as the directional input device 26 of FIG. 1. The joy stick 90 includes a base 92 and a user manipulatable handle 94. The handle 94 is movable in any of a number of pre-determined directions each of which corresponds to one of the pre-determined directions 62.

Figure 5:
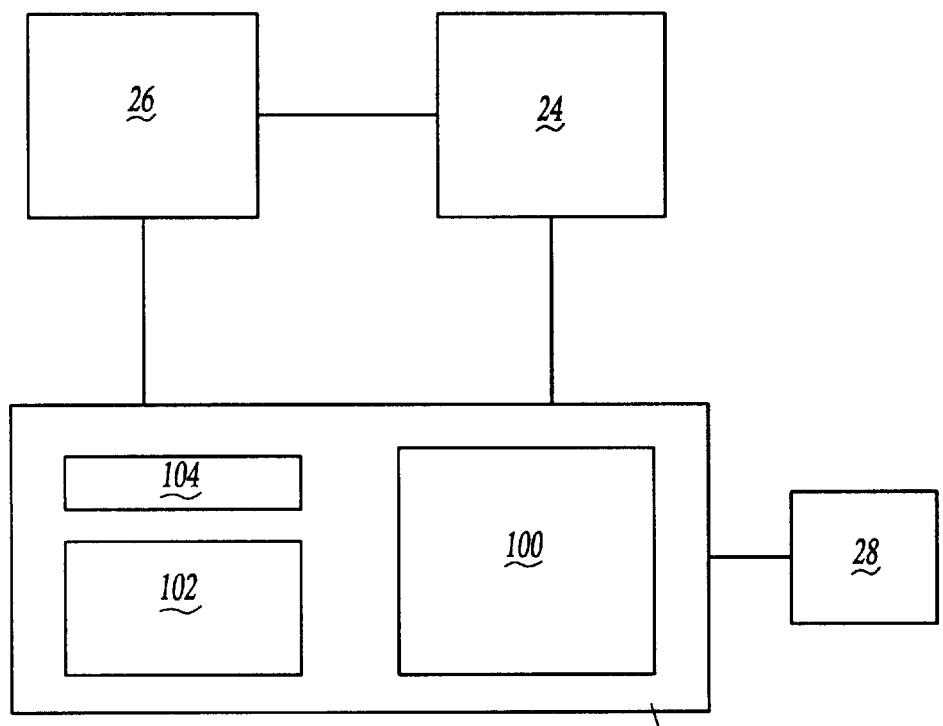
FIG. 5 is a schematic view of a processor connected to a database, a display device, and a directional input device.

FIG. 5 is a schematic view of the CPU 22 connected to the display device 24 and the directional input device 26. The CPU 22 includes a comparator 100, a route determination system 102, and a filter 104 preferably all of which are implemented in software.

Figure 6:
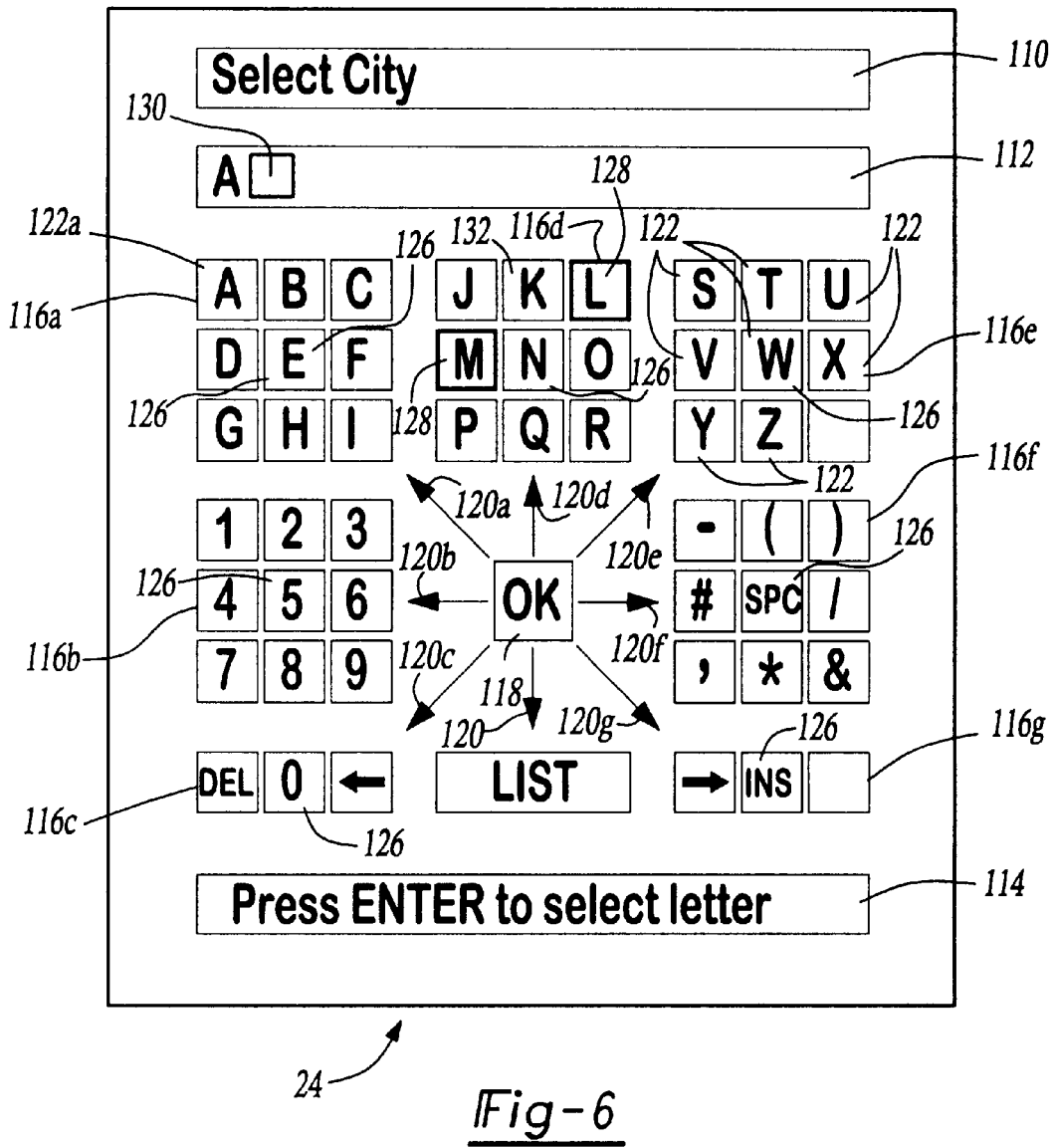
FIG. 6 is a screen display of an embodiment of the graphical user interface of the present invention illustrating the category of select a destination city.

FIG. 6 is a screen display of an alternative embodiment of the graphical user interface of the present invention illustrating the category of "select a destination city." The display device 24 includes a category field 110 that displays a user selected category of information. In FIG. 6, the category of information selected is the destination city. The display device 24 further includes a selection field 112 and an instruction field 114. A plurality of groups 116a through 116g are arranged around a start position 118. Each group 116 is located in a unique, pre-determined direction 120a through 120g relative to the start position 118. A first group 116a is located in an upper left direction relative to the start 118. Each group 116 includes a plurality of symbols 122. The symbols 122 in each group 116 are arranged around a central position 126, which also comprises a symbol 122, in the group 116. The first group 116a includes a first symbol 122a. In FIG. 6, the symbols "M" and "L" are shown as enabled symbols 128, which can be selected in response to a selection signal. In this embodiment, all symbols 122 that are not enabled symbols 132 are converted to disabled symbols 132, for example the letter "K" in FIG. 6. In this embodiment, a disabled symbol 132 can not be selected by transmitting a selection signal from the directional input device 26. An enabled symbol 128 or the start position 118 may be indicated by a change in color, a brightening, an outline, flashing, or other known destructive markings. The display device also displays a cursor 130, which may be indicated by a change in color, a brightening, an outline, flashing, or other known destructive markings.

By way of illustration, the method of the present invention and use of the graphical user interface shown in FIG. 2 will be described as it would be used to select a destination city. As will be understood by one of ordinary skill in the art, the method and graphical user interface would be similarly utilized to input other categories of information.

After a user has selected a category of information, for instance a destination city, the display device 24 displays a screen similar to that shown in FIG. 2. In the category field 50 will be displayed the category of information. Initially, the type field 52 will be blank and the lookahead field 54 will display the first entry in a list of pre-arranged symbol sequences found in the database 28 and related to the selected category of information. The start position 60 is initially activated.

A user selects the first letter of the desired destination city by moving the directional input device 26 in the pre-determined direction 62 associated with the group 58 containing the desired letter. This sends a first directional signal from the directional input device 26 to the display device 24. The central position 70 of the group 58 located in the pre-determined direction 62 is then activated. Activation of the central position 70 activates the group 58. If the user wishes to select the symbol 66 located at the central position 70 of the activated group 58, the user sends a selection signal from the directional input device 26 to the display device 24. The selected symbol 66 is then displayed in the type field 52.

If the user does not wish to select the symbol 66 located at the central position 70, then the user moves the directional input device 26 in one of the pre-determined directions 62 and thereby sends a second directional signal to the display device 24. The symbol 66 located in the direction relative to the central position 70 associated with the second directional signal is then activated. If the user then sends a selection signal, the activated symbol 66 is selected and is displayed in the type field 52.

After the first symbol 66 is selected, the comparator 100 in the CPU 22 compares the selected symbol 66 in the type field 52 to the list of pre-arranged symbol sequences in the database 28. In this example the list would be of city names. The first city in the list that begins with the selected symbol 66 in the type field 52 is then displayed in the lookahead field 54. The start position 60 is then reactivated. If the user then sends a selection signal from the directional input device 26, the city displayed in the lookahead field 54 will be selected and it replaces the symbol 66 displayed in the type field 52.

To select the city displayed in the lookahead field 54, the user could also manipulate the directional input device 26 in the direction associated with the "list" icon in FIG. 2, this sends a directional signal to the display device 24 and the "list" icon is activated. A popup menu with an alphabetized list of city names, centered on the first city that begins with the character in the type field 52 is then displayed on the display device 24. The user can scroll through the list of city names using the directional input device 26, the city that is in the centered position is shown as activated. If the user then sends a selection signal from the directional input device 26, the activated city is selected and it replaces the symbol 66 displayed in the type field 52. As a further option, the directional input device 26 may include a view button (not shown). Pressing the view button toggles the screen shown on the display device 24 between a full screen list of city names and the display shown in FIG. 2.

The user can continue to select additional symbols 66. Subsequently selected symbols 66 are displayed in the type field 52 in the order in which they are selected. After each symbol 66 has been selected, the comparator 100 again compares the sequence of symbol 66 in the type field 52 to the lists of pre-arranged symbol sequences in the database 28 and displays in the lookahead field 54 the first pre-arranged symbol sequence that includes the sequence displayed in the type field 52.

After each selection signal is transmitted, the start position 60 is again activated and another symbol 66 can be selected. Thus, any symbol 66 in any group 58 shown in the display device 24 can be selected with a maximum of three key strokes. The maximum three key strokes are a first directional signal, a second directional signal, and a selection signal.

By way of a second illustration, the method of the present invention and the use of the graphical user interface shown in FIG. 6 will be described as it would be used to select a destination city. As will be understood by one of ordinary skill in the art, the method and graphical user interface would be similarly utilized to input other categories of information. The main difference between the graphical user interface embodiment shown in FIG. 2 and that shown in FIG. 6 is that the screen shown in FIG. 6 is the embodiment that would be displayed when the filter 104 is incorporated in the CPU 22.

After a user has selected a category of information, for instance a destination city, the display device 24 displays a screen similar to that shown in FIG. 6. In the category field 110 will be displayed the category of information. Initially, the selection field 112 will be blank the start position 118 will be activated.

A user selects the first letter of the desired destination city by moving the directional input device 26 in the pre-determined direction 120 associated with the group 116 containing the desired letter. This sends a first directional signal from the directional input device 26 to the display device 24. The central position 126 of the group 116 located in the pre-determined direction 120 is then activated. Activation of the central position 126 activates the group 116. If the user wishes to select the symbol 122 located at the central position 126 of the activated group 116, the user sends a selection signal from the directional input device 26 to the display device 24. The selected symbol 122 is then displayed in the selection field 112.

If the user does not wish to select the symbol 122 located at the central position 126, then the user moves the directional input device 26 in one of the pre-determined directions 120 and thereby sends a second directional signal to the display device 24. The symbol 122 located in the direction relative to the central position 126 associated with the second directional signal is then activated. If the user then sends a selection signal, the activated symbol 122 is selected and is displayed in the selection field 112.

After the first symbol 122 is selected, the comparator in the CPU 22 compares the selected symbol 122 in the selection field 112 to the list of pre-arranged symbol sequences in the database 28. In this example, the list would be of city names. The entire name of the first city in the list that begins with the selected symbol 122 in the selection field 112 is then displayed in the selection field 112. The cursor 130 will be centered on the second symbol 122 of the name of the first city in the list. The start position 118 is then re-activated. If the user then sends a selection signal from the directional input device 26, the city displayed in the selection field 112 will be selected. The cursor 130 will be displayed in the selection field 112 adjacent to the first symbol 122.

The user can continue to select additional symbols 122. But in the embodiment shown in FIG. 6, only the enabled symbols 128 can be selected subsequent to the selection of the first symbol 122 and disabled symbols 132 can not be selected. In this embodiment, the CPU 22 also includes a filter 104. The filter 104 in conjunction with the comparator 100 determines which of the symbols 122 will be enabled symbols 128 based on the list of pre-arranged symbol sequences in the database 28. By way of illustration only, assume that the user has selected as a first symbol 122 the letter "A" and that the list of city names available in the database 28 that begin with the letter "A" consists of "alpha," "alto," and "amy." After the user has selected as the first symbol 122 the letter "A," the comparator 100 in conjunction with the CPU 22 determines that the three possible city names that begin with the letter "A" consist of alpha, alto, and amy. The city name alpha will be displayed in the selection field 112 with the cursor 130 located adjacent to the letter "A." The filter 104 will then convert the symbols 122 "L" and "M" into enabled symbols 128 and convert all the other symbols 122 into disabled symbols 132. A user will not be able to select any symbol 122 other than the enabled symbols 128. If the user then selects the letter "L" as the second symbol 122, the letter "M" will be converted by the filter 104 into a disabled symbol 132 and the letters "P" and "T" will be converted from disabled symbols 132 into enabled symbols 128. If the user then selects enabled symbol 128 "T" the graphical user interface also has an auto-fill feature wherein, once the filter 104 determines that there is only a single matching pre-arranged symbol sequence in the list in the database 28, the filter 104 in conjunction with the CPU 22 will automatically fill in the rest of the symbols 122 to complete the single available pre-arranged symbol sequence from the list. Likewise, if the user had selected enabled symbol 128 "P" the filter 104 in conjunction with the CPU 22 would automatically select the only possible matching pre-arranged symbol sequence of the city "alpha."

The graphical user interface of this embodiment includes the further feature that if a user deletes a previously selected symbol 122 at a point where the filter 104 determines that there are more than one possible enabled symbols 128, then the filter 104 will re-enable the symbols 122 that are possible enabled symbols 128. By way of illustration, if the user had selected, in order, the sequence of symbols 122 of "AL," then the letters "P" and "T" would be enabled symbols 128. If the user then deleted the symbol 122 "L, " the filter 104 would convert the symbols 122 "L" and "M" into enabled symbols 128.

In the embodiment shown in FIG. 6, the filter 104 is only used to filter symbols 122 and convert them into enabled symbols 128 and disabled symbols 132 when the category in the category field 110 has a corresponding list of pre-arranged symbol sequences in the database 28. If the category is one without such a list, for instance a category of "address book," then the filter 104 does not operate to limit the available symbols 122 that can be selected by a user.

An additional feature of the graphical user interfaces shown in FIGS. 2 and 6 is that they include a group wrap feature. This feature operates in the following manner. Beginning from the start position 60, a user sends a first directional signal and activates the central position 70 of a group 58. The user then sends a second directional signal activating one of the symbols 66 not found in the central position 70 of a group 58. If the user then sends a third directional signal and the third directional signal is in the direction of a group 58 that is adjacent to the activated symbol 66, either physically on the display device 24 or via a wrap, then the central position 70 of that adjacent group 58 is activated.

After a user has selected a destination city using one of the above described procedures, the user may be prompted to input additional information such as a street name, street address, or landmark. The user will input this additional information using the directional input device 26.

Once the user has input all of the necessary information, the navigation system 20 selects the potential route with the lowest total cost to be the recommended route. Depending upon the predetermined algorithm of the navigation system 20, the navigation system 20 will recommend the route with the shortest total length, the lowest total time, or some weighted average of length and time.

The recommended route is then displayed to the user on the display device 24 as a map showing the starting point and desired destination and highlighting the recommended route. Preferably, if the navigation system 20 is installed in a vehicle 32, the navigation system 20 displays the current position of the vehicle 32 and provides turn-by-turn instructions to the driver, guiding the driver to the selected destination.

The foregoing description is exemplary rather than limiting in nature. Variations and modifications to the disclosed embodiment may become apparent to those skilled in the art and do come within the scope of this invention. Accordingly, the scope of legal protection afforded this invention can only be determined by studying the following claims.

We claim:

1. A method for activating a symbol from a plurality of symbols in a graphical user interface, said method comprising the steps of;

a.) initially displaying a plurality of groups and a plurality of symbols including a first symbol in each group, said plurality of groups including a first group, said plurality of groups displayed around a start position on a display device, each of said groups in a unique pre-determined direction relative to the start position;

b.) transmitting a first directional signal associated with one of the unique predetermined directions from a directional input device;

c.) activating the first group in response to the first directional signal; d.) transmitting a second directional signal from the directional input device;

e.) activating the first symbol of the first group in response to the second directional symbol.

2. A method for activating a symbol from a plurality of symbols in a graphical user interface as recited in claim 1 further including the step of activating one of the symbols within the first group in response to the first directional signal.

3. A method for activating a symbol from a plurality of symbols in a graphical user interface as recited in claim 1 wherein each of the groups includes a central position and each of the symbols within a group are arranged in a unique pre-determined direction relative to the central position.

4. A method for activating a symbol from a plurality of symbols in a graphical user interface as recited in claim 3 wherein the plurality of symbols within a group are arranged relative to the central position in the same arrangement as the plurality of groups relative to the start position.

5. A method for activating a symbol from a plurality of symbols in a graphical user interface as recited in claim 1 including the further step of transmitting a first selection signal from the directional input device, thereby selecting the activated first symbol.

6. A method for activating a symbol from a plurality of symbols in a graphical user interface as recited in claim 5 including the further steps of:

displaying the selected first symbol in a type field on the display device;

activating a second symbol of one of the plurality of groups;

transmitting a second selection signal, thereby selecting the activated second symbol; and displaying the selected second symbol in the type field adjacent to the first symbol.

7. A method for activating a symbol from a plurality of symbols in a graphical user interface as recited in claim 6 including the further steps of comparing the sequence of the first symbol and the second symbol in the type field to a database of a plurality of pre-arranged symbol sequences and displaying in a lookahead field a first pre-arranged symbol sequence that includes the symbol sequence in the type field.

8. A method for activating a symbol from a plurality of symbols in a graphical user interface as recited in claim 7 including the further steps of activating the lookahead field;

transmitting a third selection signal, thereby selecting the first pre-arranged symbol sequence; and replacing the sequence of the first symbol and the second symbol in the type field with the first pre-arranged symbol sequence.

9. A method for activating a symbol from a plurality of symbols in a graphical user interface as recited in claim 5 including the further steps of:

comparing the selected first symbol to a list of pre-arranged symbol sequences in a database;

filtering from the list a plurality of filtered pre-arranged symbol sequences wherein each of the filtered pre-arranged symbol sequences includes the selected first symbol as its first symbol; and displaying in a selection field on the display device a first filtered pre-arranged symbol sequence.

10. A method for activating a symbol from a plurality of symbols in a graphical user interface as recited in claim 9 including the further steps of:

filtering the plurality of symbols in the plurality of groups; and enabling a plurality of symbols and disabling a plurality of symbols, wherein each one of the plurality of enabled symbols represents a second symbol in one of the filtered plurality of pre-arranged symbol sequences.

11. A method for activating a symbol from a plurality of symbols in a graphical user interface as recited in claim 10 including the further steps of:

activating one of the enabled symbols;

transmitting a second selection signal from the directional input device, thereby selecting the activated enabled symbol as a second symbol; and displaying the second symbol in the selection field adjacent to the first symbol.

12. A method for activating a symbol from a plurality of symbols in a graphical user interface as recited in claim 11 including the further steps of:

filtering from the plurality of filtered pre-arranged symbol sequences a second pre-arranged symbol sequence wherein the second pre-arranged symbol sequence is different from the first filtered pre-arranged symbol sequence and the second pre-arranged symbol sequence includes as its first and second symbols the first symbol and the second symbol displayed in the selection field; and replacing the first filtered pre-arranged symbol sequence with the second pre-arranged symbol sequence in the selection field.

13. A method for activating a symbol from a plurality of symbols in a graphical user interface as recited in claim 1 wherein the plurality of symbols includes the characters of a human language and step e.) comprises activating one of the characters.

14. A method for activating a symbol from a plurality of symbols in a graphical user interface as recited in claim 1 including the further steps after step e.) of transmitting a third directional signal associated with one of the unique pre-determined directions from the directional input device and activating one of the pluralities of groups in response to the third directional signal.

15. A graphical user interface comprising:

a display device initially displaying a plurality of groups and a plurality of symbols in each group, each group located in one of a plurality of pre-determined directions relative to a start position;

said plurality of symbols of each of said groups arranged about a central position in each of said groups;

an input device connected to said display device, said input device having a selection signal and a plurality of directional output signals, each of said plurality of output signals associated with one of said plurality of pre-determined directions; and each group activatable in response to one of said plurality of output signals, each symbol within an activated group of said plurality of groups activatable in response to one of said plurality of output signals, an activated symbol selectable in response to said selection signal.

16. A graphical user interface as recited in claim 15 wherein said input device includes an eight way directional control.

17. A graphical user interface as recited in claim 15 wherein said symbols include the characters of a human language.

18. A graphical user interface as recited in claim 15 further including a type field on said display device, said type field displaying a selected symbol.

19. A graphical user interface as recited in claim 15 further including a symbol sequence comparator connected to a processor, a database of pre-arranged symbol sequences accessible by said processor, and a lookahead field on said display device, said lookahead field displaying one of said pre-arranged symbol sequences accessed by said processor in response to said selected symbol displayed in said type field.

20. A graphical user interface as recited in claim 19 wherein said lookahead field is activatable in response to one of said directional output signals and said pre-arranged symbol sequence displayed in said lookahead field is selectable in response to said selection signal.

21. A graphical user interface as recited in claim 15 wherein a first symbol of said plurality of symbols within each of said plurality of groups is located at said central position, said first symbol activated when said group is activated.

22. A graphical user interface as recited in claim 15 further including a selection field on said display device, said selection field displaying a selected symbol.

23. A graphical user interface as recited in claim 22 further including a symbol sequence comparator and a filter connected to a processor, a database having a plurality of pre-arranged symbol sequences accessible by said processor; said filter filtering at least one of said plurality of pre-arranged symbol sequences in response to said selected symbol; and said processor replacing said selected symbol with at least one of said plurality of pre-arranged symbol sequences in said selection field.

24. A graphical user interface as recited in claim 23 wherein at least one of said plurality of pre-arranged symbol sequences displayed in said selection field is selectable in response to said selection signal.

* * * * *